United States Patent
Murata et al.

(10) Patent No.: US 7,828,095 B2
(45) Date of Patent: Nov. 9, 2010

(54) IN-WHEEL MOTOR AND WHEEL ASSEMBLY WITH THIS IN-WHEEL MOTOR

(75) Inventors: Satoshi Murata, Nishikamo-gun (JP); Michitaka Tsuchida, Susono (JP); Hiroaki Urano, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 265 days.

(21) Appl. No.: 11/836,952

(22) Filed: Aug. 10, 2007

(65) Prior Publication Data

US 2008/0035399 A1  Feb. 14, 2008

(30) Foreign Application Priority Data

Aug. 11, 2006  (JP) .............................. 2006-219765

(51) Int. Cl.
  *B60K 1/00*  (2006.01)
(52) U.S. Cl. .................... 180/65.51; 180/65.1; 180/65.6
(58) Field of Classification Search ............... 180/65.51
  See application file for complete search history.

(56) References Cited

U.S. PATENT DOCUMENTS

| | | | |
|---|---|---|---|
| 3,812,928 A * | 5/1974 | Rockwell et al. ......... | 180/65.51 |
| 4,799,564 A * | 1/1989 | Iijima et al. .............. | 180/65.51 |
| 5,014,800 A * | 5/1991 | Kawamoto et al. ....... | 180/65.51 |
| 5,034,638 A | 7/1991 | McCabria | |
| 5,111,090 A | 5/1992 | Otake et al. | |
| 5,127,485 A * | 7/1992 | Wakuta et al. ........... | 180/65.51 |
| 5,156,579 A | 10/1992 | Wakuta et al. | |
| 5,163,528 A | 11/1992 | Kawamoto et al. | |
| 5,472,059 A | 12/1995 | Schlosser et al. | |
| 5,698,912 A * | 12/1997 | Rasch et al. ............ | 310/52 |
| 6,100,615 A | 8/2000 | Birkestrand | |
| 6,355,996 B1 * | 3/2002 | Birkestrand .............. | 310/54 |
| 6,358,173 B1 | 3/2002 | Klemen et al. | |
| 6,725,823 B2 | 4/2004 | Hori et al. | |
| 6,752,227 B1 | 6/2004 | Bachmann | |
| 6,863,140 B2 | 3/2005 | Noreikat et al. | |
| 7,421,928 B2 * | 9/2008 | Klaus et al. .............. | 74/606 R |
| 2005/0045393 A1 * | 3/2005 | Mizutani et al. ......... | 180/65.5 |
| 2005/0061565 A1 * | 3/2005 | Mizutani et al. ......... | 180/65.5 |
| 2005/0206251 A1 | 9/2005 | Foster | |
| 2005/0236198 A1 * | 10/2005 | Jenkins ..................... | 180/65.5 |
| 2006/0144626 A1 * | 7/2006 | Mizutani et al. ......... | 180/65.5 |
| 2006/0219449 A1 * | 10/2006 | Mizutani et al. ......... | 180/65.5 |

FOREIGN PATENT DOCUMENTS

| | | |
|---|---|---|
| DE | 102005035185 | 3/2006 |
| JP | U-58-186776 | 12/1983 |

(Continued)

*Primary Examiner*—J. Allen Shriver, II
*Assistant Examiner*—Katy Meyer
(74) *Attorney, Agent, or Firm*—Oblon, Spivak, McClelland, Maier & Neustadt, L.L.P.

(57) ABSTRACT

A motor has a stator core, a coil, a rotor, and a motor case in which the stator core, the coil, and the rotor are housed. The motor is also provided with a fluid carrying member that is arranged around a coil end of the coil in the motor case and has an inlet hole that is communicated with a fluid supply source and a distribution hole that is communicated with a space inside the motor case.

4 Claims, 6 Drawing Sheets

FOREIGN PATENT DOCUMENTS

| | | |
|---|---|---|
| JP | A-60-162434 A | 8/1985 |
| JP | A-62221918 A | 9/1987 |
| JP | A 03-150050 A | 6/1991 |
| JP | 5-169985 | 7/1993 |
| JP | A-5338446 A | 12/1993 |
| JP | 9-23615 | 1/1997 |
| JP | A-09-154258 A | 6/1997 |
| JP | A 09-226394 A | 9/1997 |
| JP | 2001-016826 A | 1/2001 |
| JP | A 2002-058207 A | 2/2002 |
| JP | AA 2003-009467 A | 1/2003 |
| JP | 2004-72812 | 3/2004 |
| JP | 2004-90822 | 3/2004 |
| JP | 2005-67416 | 3/2005 |
| JP | 2005-73364 | 3/2005 |
| JP | 2005-168120 | 6/2005 |
| JP | 2005-237176 | 9/2005 |
| JP | A 2001-258209 A | 9/2010 |

\* cited by examiner

VEHICLE INSIDE ← → VEHICLE OUTSIDE

IN-WHEEL MOTOR AND WHEEL ASSEMBLY WITH THIS IN-WHEEL MOTOR

INCORPORATION BY REFERENCE

The disclosure of Japanese Patent Application No. 2006-219765 filed on Aug. 11, 2006, including the specification, drawings and abstract is incorporated herein by reference in its entirety.

BACKGROUND OF THE INVENTION

1. Field of the Invention

The invention relates to an in-wheel motor and a wheel assembly with this in-wheel motor.

2. Description of the Related Art

Japanese Patent Application Publication No. JP-A-2005-73364, for example, describes a related wheel assembly with an in-wheel motor, which includes a motor, a rotating shaft that rotates according to output torque of the motor, an oil pump provided at one end of the rotating shaft, and an oil passage that supplies oil from the oil pump to an outer periphery of a stator core of the motor. In this wheel assembly with an in-wheel motor, the oil from the oil pump is supplied into the motor from the outer periphery of the stator core of the motor via an oil passage which has an open end at the upper portion of the motor case. The oil supplied in this way is used to cool the stator core and the stator coil, after which it is used to lubricate the bearings that support the shafts of the motor and a reduction gear.

However, in the related art described above, the processing to form the oil passage, which has the open end in the upper portion of the motor case, in the motor case is difficult. That is, in the foregoing related art, the oil passage is formed by drilling a hole in the motor axial direction in the peripheral wall of the motor case, and then forming another passage that connects to the terminal end of that hole by drilling another hole from the inner peripheral side of the motor case toward the outside in the radial direction. This processing is not easy and requires many machining hours.

SUMMARY OF THE INVENTION

This invention thus provides an in-wheel motor and a wheel assembly with this in-wheel motor (the term "in-wheel motor" in this specification refers to a motor that is housed within a wheel), in which a passage for supplying fluid into a motor case is formed by a simple process.

A first aspect of the invention relates to a motor that includes a stator core, a coil, a rotor, and a motor case in which the stator core, the coil, and the rotor are housed. This motor also includes a tubular fluid carrying member which is provided around a coil end of the coil in the motor case and has an inlet hole for receiving fluid from a fluid supply source and a distribution hole that is communicated with a space inside the motor case.

A second aspect of the invention relates to a wheel assembly with an in-wheel motor, which includes a motor for driving a wheel, an oil pump that is driven by rotational output of the motor, and a tubular oil carrying member. The motor for driving a wheel is arranged within the wheel and has a stator core, a coil, a rotor, and a motor case in which the stator core, the coil, and the rotor are housed. The tubular oil carrying member is provided around a coil end of the coil in the motor case and has an inlet hole for receiving oil from the oil pump, and a distribution hole that is communicated with a space inside the motor case.

A third aspect of the invention relates to a wheel assembly with an in-wheel motor, which includes a motor for driving a wheel, a counter gear, a bearing that rotatably supports a rotating shaft of the counter gear, a bearing, a fluid supply source, and a tubular fluid carrying member. The motor for driving a wheel is arranged within the wheel and has a stator core, a coil, a rotor, and a motor case in which the stator core, the coil, and the rotor are housed. The counter gear reduces the rate of rotational output of an output shaft of the motor and transmits the resultant rotational output to the wheel. The bearing rotatably supports a rotating shaft of the counter gear. The tubular fluid carrying member is provided around a coil end of the coil in the motor case and has an inlet hole for receiving fluid from the fluid supply source and a distribution hole that is communicated with the bearing.

A fourth aspect of the invention relates to a wheel assembly with an in-wheel motor, which includes a motor for driving a wheel, a counter gear, a bearing, a fluid supply source, and a distribution hole. The motor for driving a wheel is arranged within the wheel and has a stator core, a coil, a rotor, and a motor case in which the stator core, the coil, and the rotor are housed. The counter gear reduces the rate of rotational output of an output shaft of the motor and transmits the resultant rotational output to the wheel. The bearing rotatably supports a rotating shaft of the counter gear. The fluid supply source is driven by rotational output of the rotating shaft of the counter gear, and the distribution hole is formed in the motor case and supplies fluid from the fluid supply source to the bearing.

Thus, the invention is able to provide an in-wheel motor and a wheel assembly with this in-wheel motor, in which a passage for supplying fluid into a motor case can be formed by a simple processing method.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
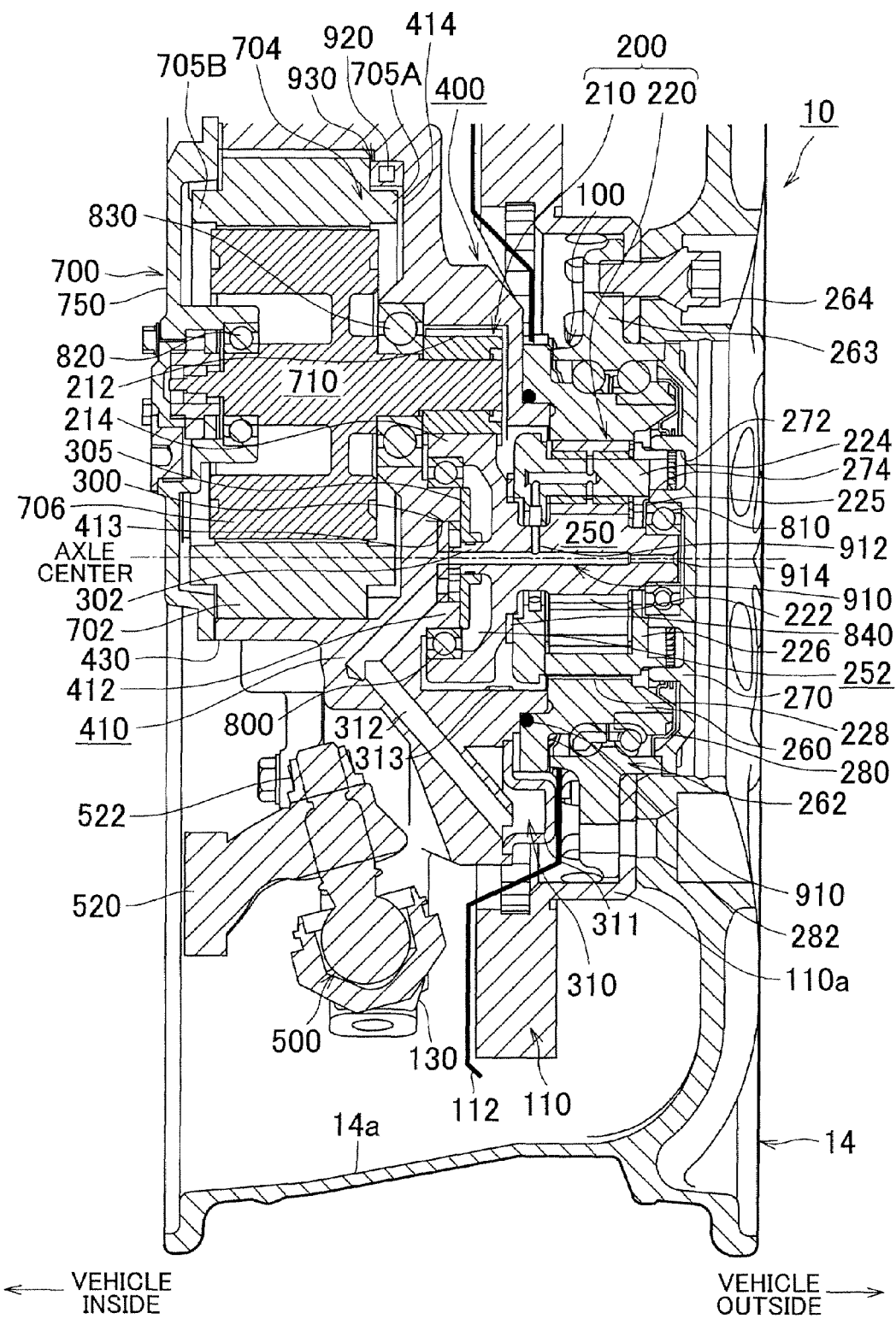
FIG. 1 is a sectional view of the main structure of a wheel assembly with an in-wheel motor according to one example embodiment of the invention.

In the following description and the accompanying drawings, the present invention will be described in more detail in terms of exemplary embodiments. FIG. 1 is a sectional view of the main structure of a wheel assembly with an in-wheel motor according to one example embodiment of the invention. In the drawing, the tire, as well as the upper $\frac{1}{3}$ or so of the wheel, is omitted.

A tire/wheel assembly 10 includes a wheel 14 to which a tire, not shown, is mounted. As will be described in detail later, the main portions of the constituent elements related to the motor are housed in a space enclosed by a rim inner peripheral surface 14a of the wheel 14. In the following description, the words "inside of the tire/wheel assembly" refer to the generally columnar space that is enclosed by the rim inner peripheral surface 14a of the wheel 14. However, expressions such as "a part is arranged inside the tire/wheel assembly" do not always mean that the entire part is housed completely within this generally columnar space. They also include structures in which a portion of the part partially protrudes from within that generally columnar space.

Figure 2:
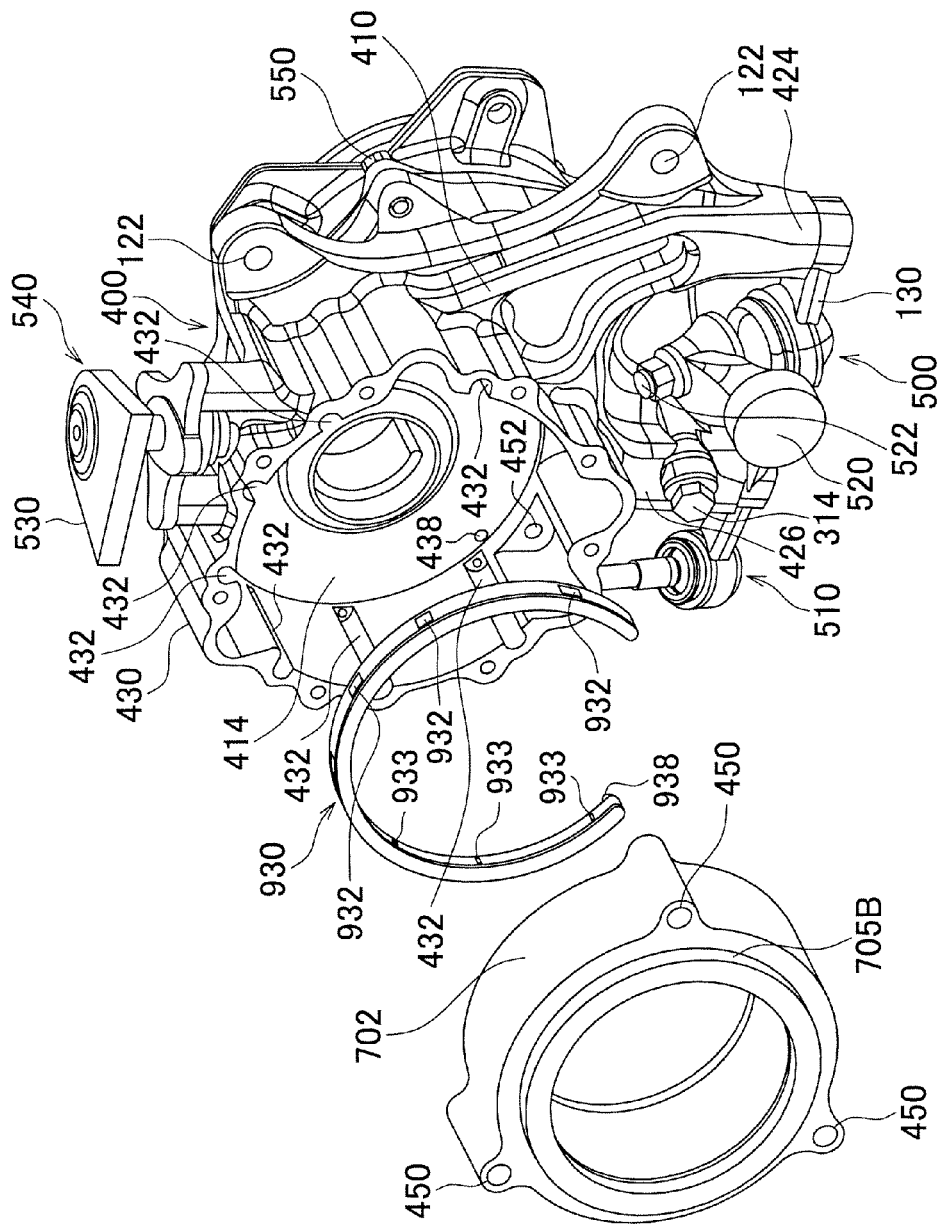
FIG. 2 is a partial exploded perspective view of the internal structure of an oil delivery, a stator core, and a peripheral wall portion of a knuckle.

Arranged within the tire/wheel assembly 10 are mainly an axle bearing 100, a brake disc 110, a brake dust cover 112 that covers the brake disc 110 from the inner side of the vehicle in the vehicle width direction (hereinafter also referred to simply as "vehicle inside"), a brake caliper (not shown), a motor 700 for driving the wheel, a reduction mechanism 200, an oil pump 300, an oil tank (i.e., an oil reservoir) 310, oil flow paths 910 and 920, a knuckle (i.e., a carrier) 400, and a lower ball joint 500 that is connected to a wheel-side end portion of a lower arm 520. Also, a ball joint 510 (hereinafter referred to as "tie rod B/J 510") (see FIG. 2) that is connected to a wheel-side end portion of a tie-rod, not shown, and an upper ball joint 540 (see FIG. 2) that is connected to the wheel-side end portion of an upper arm 530 (a portion of which is shown in FIG. 2) are also arranged in the tire/wheel assembly 10. However, when strut type suspension is used, the lower end of the strut (i.e., shock absorber), instead of the upper arm 530, is connected to the upper side of the knuckle 400.

The motor 700 is arranged in a space on the vehicle inside within the tire/wheel assembly 10. As shown in FIG. 1, the motor 700 is arranged offset upward and forward with respect to the axle center (see FIG. 4). Accordingly, a space not occupied by the motor 700, which corresponds to the amount that the motor 700 is offset, is created to the lower rear on the vehicle inside within the tire/wheel assembly 10, as shown in FIG. 1. Therefore, the lower space on the vehicle inside within the tire/wheel assembly 10 is larger than it is with a structure in which the motor is arranged on the same axis as the axle center. As a result, there is a larger degree of freedom for arranging the suspension on the lower side. Also, the brake caliper can easily be housed on the side (i.e., the vehicle rear side in this example) opposite the side (i.e., the vehicle front side) to which the motor 700 is offset within the tire/wheel assembly 10 (see the brake caliper mounting point 122 in FIG. 2).

The motor 700 includes a stator core 702, a stator coil 704, and a rotor 706. If the motor 700 is a three phase motor, the stator coil 704 may include a U phase coil, a V phase coil, and a W phase coil. The rotor 706 is arranged on the inner peripheral sides of the stator core 702 and the stator coil 704.

The rotor 706 of the motor 700 has an output shaft 710, the rotational center of which is offset with respect to the axle center, as described above. The output shaft 710 is rotatably supported by a motor cover 750 via a bearing 820 on the vehicle inside in the tire/wheel assembly 10, as well as rotatably supported by the knuckle 400 (main structure portion 410) via a bearing 830 on the outer side of the vehicle in the vehicle width direction (hereinafter also referred to simply as "vehicle outside") in the tire/wheel assembly 10. The bearings 820 and 830 may be radial ball bearings which use balls as rolling bodies, such as single-row, deep-grooved ball bearings, for example.

The rotational output of the motor 700 is transmitted to the wheel 14 via the reduction mechanism 200. The reduction mechanism 200 is a twin shaft reduction mechanism which includes a counter gear mechanism 210 and a planetary gear set 220. Thus the reduction mechanism realizes a two step reduction. Gears 212, 214, 222, 224, 226, and 228 of the reduction mechanism 200, which will be described below, may be helical gears.

As shown in FIG. 1, the counter gear mechanism 210 is arranged farther to the vehicle outside than the motor 700. The counter gear mechanism 210 includes a small diameter driving gear 212 which is arranged on the output shaft 710 of the motor 700, and a large diameter counter gear 214 that is in mesh with the driving gear 212. The small diameter driving gear 212 is spline fitted to the output shaft 710 of the motor 700 from the vehicle outside, and thus integrated with the output shaft 710. The large diameter counter gear 214 is formed with the axle center as its rotational center. Thus, the output shaft 710 of the motor 700 is arranged offset with respect to the axle center by approximately the distance of the combined radii of the driving gear 212 and the counter gear 214.

As shown in FIG. 1, the planetary gear set 220 is arranged farther to the vehicle outside than the counter gear mechanism 210 within the tire/wheel assembly 10. The planetary gear set 220 is arranged on the same axis as the axle center, and includes a sun gear 222, a planetary gear 224, a planetary carrier 226, and a ring gear 228.

The sun gear 222 is connected to the counter gear 214 of the counter gear mechanism 210. In the example shown in FIG. 1, the sun gear 222 is formed on one end side of a shaft (i.e., sun gear shaft) 250 and the counter gear 214 is formed on the other end side of the shaft 250 in the width direction of the vehicle. More specifically, the shaft 250 has a rotational center that is on the same axis as the axle center. The sun gear 222 is positioned on the peripheral surface of the end portion on the vehicle outside, and the counter gear 214 is positioned on the peripheral surface of the end portion on the vehicle inside. The end portion of the shaft 250 on the vehicle inside is rotatably supported by the knuckle 400 via a bearing 800, and the end portion of the shaft 250 on the vehicle outside is rotatably supported by a disc-shaped power transmitting member 270 via a bearing 810. The sun gear 222 and the counter gear 214 may also be formed as separate parts, in which case they may be connected using splines. Also, the bearings 800 and 810 may be radial ball bearings which use balls as rolling bodies, such as single-row, deep-grooved ball bearings, for example. Further, as shown in FIG. 1, the bearing 800 may be incorporated inside (i.e., on the inner peripheral side of) the counter gear 214, and a convex portion 412 of the knuckle 400 connected by press-fitting or the like to the inner race side of the bearing 800.

The planetary gear 224 is in mesh with the sun gear 222 on the inner peripheral side and in mesh with the ring gear 228 on the outer peripheral side. The planetary gear 224 is rotatably supported by the planetary carrier 226 via a roller bearing 225. The rotational center of the planetary carrier 226 is the same as the axle center. The planetary carrier 226 is supported at the vehicle inside within the tire/wheel assembly 10 by the shaft 250 via a thrust cylindrical roller bearing 840, and is spline fitted at the vehicle outside to a circumferential groove 272 formed circumferentially in the power transmitting member 270. A plurality of the planetary gears 224 are arranged at equidistant intervals around the sun gear 222. The planetary gears 224 and the planetary carrier 226 are assembled to form a single unit (hereinafter referred to as "planetary gear unit"). The planetary carrier 226 of this planetary gear unit abuts against a stopper portion 274 of the power transmitting member 270 on the vehicle outside. Accordingly, displacement of the planetary gear unit in the width direction of the vehicle is restricted by the thrust cylindrical roller bearing 840 and the stopper portion 274.

The rotational center of the ring gear 228 is the same as the axle center. The ring gear 228 is formed on the inner peripheral surface of an inner race side member 260 that is arranged so as to surround the sun gear 222 from the outer peripheral side. The outer peripheral surface of the inner race side member 260 forms an inner race of the axle bearing 100. In the illustrated example, the axle bearing 100 is a double-row angular ball bearing. The outer inner race with respect to the row on the vehicle outside is formed of a separate member than the inner race side member 260. This kind of separate member is integrated with the inner race side member 260 by fitting it around the outer periphery of the inner race side member 260 and crimping it thereto.

An outer race side member 262 is arranged so as to surround the inner race side member 260 from the outer peripheral side. The inner peripheral surface of the outer race side member 262 forms an outer race of the axle bearing 100. Seals 280 and 282 for preventing foreign matter from getting in and oil from flowing out are provided at the end portions in the width direction of the vehicle between the outer race side member 262 and the inner race side member 260.

The power transmitting member 270 is a disc-shaped member provided so as to cover the vehicle outside of the reduction mechanism. The circumferential groove 272 to which the vehicle outside end portion (peripheral wall portion) of the planet carrier 226 is spline fitted is formed on the vehicle inside of the power transmitting member 270. The outer peripheral edge of the power transmitting member 270 is connected to the end portion on the vehicle outside of the outer race side member 262 by crimping or the like. That is, the power transmitting member 270 is fixed to the outer race side member 262 so that it blocks a generally circular opening on the vehicle outside of the outer race side member 262. The outer race side member 262 has a flange portion 263 that protrudes toward the outside in the radial direction on the outer peripheral surface. A bolt hole for fastening a hub bolt 264 is formed in this flange portion 263. The outer race side member 262 is fastened together with the brake disc 110 by the hub bolt to the wheel 14 with the inner peripheral portion of the brake disc 110 being sandwiched between the flange portion 263 and the wheel 14.

In the foregoing structure, when the rotor 706 of the motor 700 rotates in response to a command from a vehicle control apparatus, not shown, the small diameter driving gear 212 of the counter gear mechanism 210 rotates, and as it does so, the large diameter counter gear 214 that is in mesh with the driving gear 212 rotates, thus realizing a first reduction. When the counter gear 214 rotates, the sun gear 222, which is integral with the counter gear 214, also rotates. As a result, the planetary gears 224 rotate while revolving around the sun gear 222. This rotation realizes a second reduction. The revolving motion of the planetary gears 224 is output by the planetary carrier 226 and transmitted to the power transmitting member 270 which is spline fitted to the planetary carrier 226. The tire/wheel assembly 10 is driven as the outer race side member 262, the brake disc 110, and the wheel 14 all rotate together with the power transmitting member 270.

The knuckle 400 mainly includes a main structure portion 410 positioned near substantially the center of the tire/wheel assembly 10, a cylindrical peripheral wall portion 430 which houses the main constituent elements of the motor 700 described above on the inner peripheral side, and a bottom portion 414 that faces the vehicle outside of the main constituent elements of the motor 700. In this example, the peripheral wall portion 430 and the bottom portion 414 of the knuckle 400 form a motor case. The main constituent elements of the motor 700 described above are arranged in a space to the inside in the radial direction of the peripheral wall portion 430 of the knuckle 400. The motor cover 750 is connected to the end portion on the vehicle inside of the peripheral wall portion 430 of the knuckle 400 so as to cover the space inside the peripheral wall portion 430. A gasket, not shown, for preventing oil from leaking out may also be provided at the portion where the peripheral wall portion 430 and the motor cover 750 connect.

Unlike the thin peripheral wall portion 430 and other ribs and the like, the main structure portion 410 of the knuckle 400 has sufficient strength and rigidity, and therefore serves to receive loads input via the portion where the axle bearing 100 is connected, the mounting points of the tie rod and the suspension arm (i.e., lower arm 520, etc.), and the brake caliper mounting point 122 (see FIG. 2).

The inner race side member 260 is connected by a bolt 550 (see FIG. 2) to the end portion on the vehicle outside of the main structure portion 410 of the knuckle 400. An O-ring for preventing oil from leaking out may be provided at the joining portion between the inner race side member 260 and the main structure portion 410 of the knuckle 400.

The main structure portion 410 of the knuckle 400 receives various loads input from the tire/wheel assembly 10 via the axle bearing 100 (i.e., the inner race side member 260) at the vehicle outside end portion. The counter gear mechanism 210 described above is arranged in the space inside the main structure portion 410 of the knuckle 400. The main structure portion 410 of the knuckle 400 receives various thrust loads and radial loads input via the bearing 830 and the bearing 800. The main structure portion 410 of the knuckle 400 is highly rigid so the dynamic load rating or the dynamic equivalent load of the bearings 830 and 800 is preferably set higher than it is for the corresponding bearings 820 and 810. As a result, a reasonable structure that can withstand a large load can be realized at portions with high strength and rigidity.

The main structure portion 410 of the knuckle 400 has two leg portions 424 and 426 (see FIG. 2) that extend from the lower side. A knuckle arm 130 is fastened by a bolt or the like to the lower end of the each leg portion 424 and 426. The knuckle arm 130 extends in the longitudinal direction of the vehicle within the tire/wheel assembly 10. The tie rod B/J 510 is installed on the front end side of the knuckle arm 130 and the lower ball joint 500 is installed on the rear end side of the knuckle arm 130 (see FIG. 2). The main structure portion 410 of the knuckle 400 receives various loads input via the lower ball joint 500 and the like.

As shown in FIG. 1, the lower ball joint 500 is arranged farther toward the vehicle inside than the brake disc 110. The lower arm 520 is fastened to the lower ball joint 500 by a nut 522 from above. The lower arm 520 extends in the width direction of the vehicle and the vehicle inside end portion is supported by a vehicle body, not shown, via a bush and the like. The lower arm 520 may be any shape. For example, it may be an L-shaped lower arm or a double ring type lower arm. The lower arm 520 works in cooperation with the upper arm 530 (or strut) to pivotally support the tire/wheel assembly 10 with respect to the vehicle body. Also, a spring and an absorber, not shown, are provided between the vehicle body and the lower arm 520. As a result, input from the tire/wheel assembly 10 to the vehicle body is reduced. The spring may be any type of a spring coil or an air spring. Other than a hydraulic absorber that applies damping action to vertical input, the absorber may also be a rotary electromagnetic absorber that applies damping action to rotational input.

In this example embodiment, the motor 700 is offset upward with respect to the axle center, as described above. This increases the degree of freedom in the arrangement/position of the lower ball joint 500 (i.e. in the arrangement of the kingpin axis). For example, the lower ball joint 500 can also be moved as close to the brake disc 110 as possible, leaving only the necessary clearance, as shown in FIG. 1. As a result, the amount of offset of each member and the tire input point in the width direction of the vehicle is reduced, thereby enabling the necessary strength and rigidity of the members (such as the main structure portion 410 of the knuckle) to be reduced, which reduces weight.

The oil tank 310 is formed below the knuckle 400 and is arranged below, along a vertical line that is orthogonal to, the axle center in the tire/wheel assembly 10, as shown in FIG. 1. The oil tank 310 is preferably arranged below the lowest position of the gear portion of the reduction mechanism 200. Also, the oil tank 310 is arranged farther to the vehicle outside than the lower ball joint 500 and farther to the vehicle inside than the brake dust cover 112, as shown in FIG. 1.

The oil tank 310 is arranged using the space inside a hat portion 110a of the brake disc 110. In the example illustrated, the oil tank 310 is formed by a cover member 311 that is fixed to the knuckle 400 from the vehicle outside. The cover member 311 may be connected to the knuckle 400 by crimping or a bolt or the like. According to this structure, the oil tank 310 is arranged completely offset with respect to the lower ball joint 500 in the width direction of the vehicle. As a result, even if oil were to leak from the oil tank 310 due to the oil tank 310 being damaged or the like, the leaking oil would be reliably prevented from getting onto the lower ball joint 500, thus reliably preventing a decline in performance of the lower ball joint 500.

A lower end portion of a suction path 312 formed in the knuckle 400, as well as an oil return path 313 for returning oil formed in the knuckle 400, is communicated with the oil tank 310 (see FIG. 1). The oil tank 310 serves to collect oil for cooling the motor 700 or lubricating the reduction mechanism 200.

Figure 4:
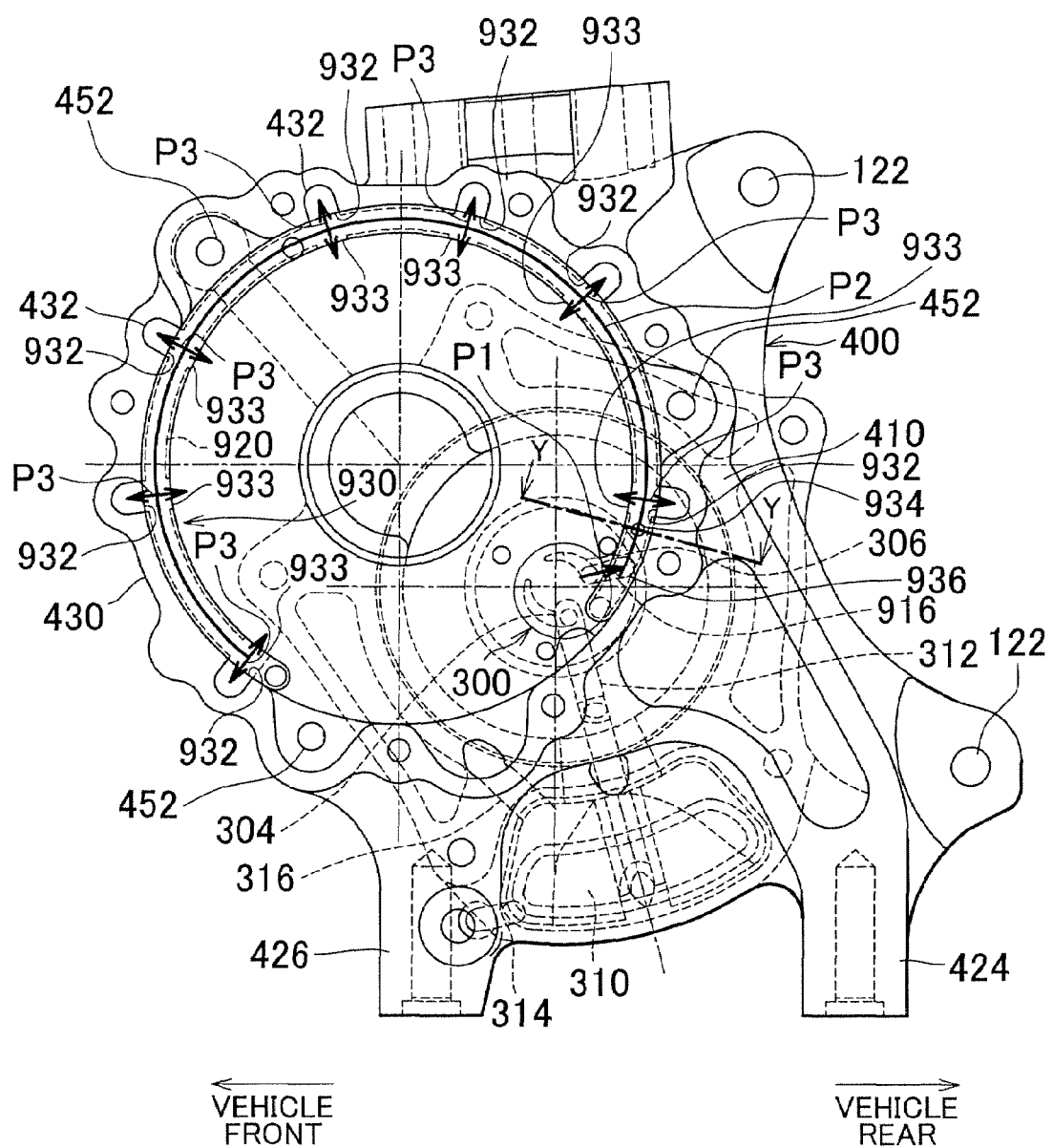
FIG. 4 is a view of oil flow paths for cooling a motor and lubricating bearings.

Also, a drain flow path 314 and a filler flow path 316 formed in the knuckle 400 are also communicated with the oil tank 310 (see FIG. 4). The openings of the drain flow path 314 and the filler flow path 316 are closed by a drain plug 314 (see FIG. 2) and a filler plug (not shown), respectively.

The oil pump 300 is arranged between the motor 700 and the planetary gear set 220 of the reduction mechanism 200 in the width direction of the vehicle. More specifically, the oil pump 300 is provided on the vehicle inside end portion of the shaft 250. In the example shown in FIG. 1, the oil pump 300 is arranged inside the counter gear 214 of the counter gear mechanism 210, i.e., to the inside of the counter gear 214 in the radial direction. More specifically, the convex portion 412 of the knuckle 400 is accommodated within a cavity 252 to the inside in the radial direction of a vehicle inside end portion (i.e., of a portion with a larger diameter for forming the counter gear 214) of the shaft 250. A concave portion 413 is formed to the inside of the convex portion 412 in the radial direction. The oil pump 300 is provided in this concave portion 413. The inside portion of this concave portion 413, as well as the area around a pump rotating shaft 302 that extends into the concave portion 413, is sealed by a seal member 305.

For example, the oil pump 300 may be not only a trochoid pump as shown in the drawings but also be any of a variety of gear pumps such as an external gear pump or an internal gear pump (with or without a crescent-shaped partition), or another type of hydraulic pump such as a vane pump.

The oil pump 300 is driven by rotational output of the motor 700. More specifically, the inner rotor of the oil pump 300 is connected to the pump rotating shaft 302 which is integral with the shaft 250, and thus rotates when the shaft 250 rotates. That is, the inner rotor of the oil pump 300 is driven by the counter gear 214. When the inner rotor rotates, so too does the outer rotor which has a rotational axis that is offset with respect to the rotational axis of the inner rotor. As a result, oil in the oil tank (reservoir tank) 310 is drawn up via the suction path 312. The oil that is drawn in through the inlet 304 (see FIG. 4) is then caught between the inner and outer rotors of the oil pump 300 and discharged from an outlet 306 (see FIG. 4) mainly to oil flow paths 910 and 920. These oil flow paths 910 and 920 will be described later.

Next, the main oil flow paths 910 and 920 through which the oil that is discharged from the oil pump 300 flows, as well as the member that forms these oil flow paths (mainly an oil delivery 930) will be described.

As shown in FIG. 1, the oil flow path 910 is formed in the shaft 250 in the lengthwise direction of the shaft 250. The vehicle inside end portion of the oil flow path 910 is communicated with the outlet 306 of the oil pump 300 (see FIG. 4). The vehicle outside end portion of the oil flow path 910 has an opening 914 that opens to the vehicle outside from the tip end portion of the shaft 250. Oil holes 912 formed in the radial direction of the shaft 250 are communicated with the oil flow path 910.

FIG. 2 is a partial exploded perspective view, as viewed from the vehicle inside, showing the relationship between the stator core 702 and the oil delivery 930 that forms the oil passage 920, as well as the internal structure of the peripheral wall portion 430 of the knuckle 400. In the drawing, the wheel 14, the brake caliper, the motor cover 750, and the rotor 706 of the motor 700 and the like are omitted.

Figure 3:
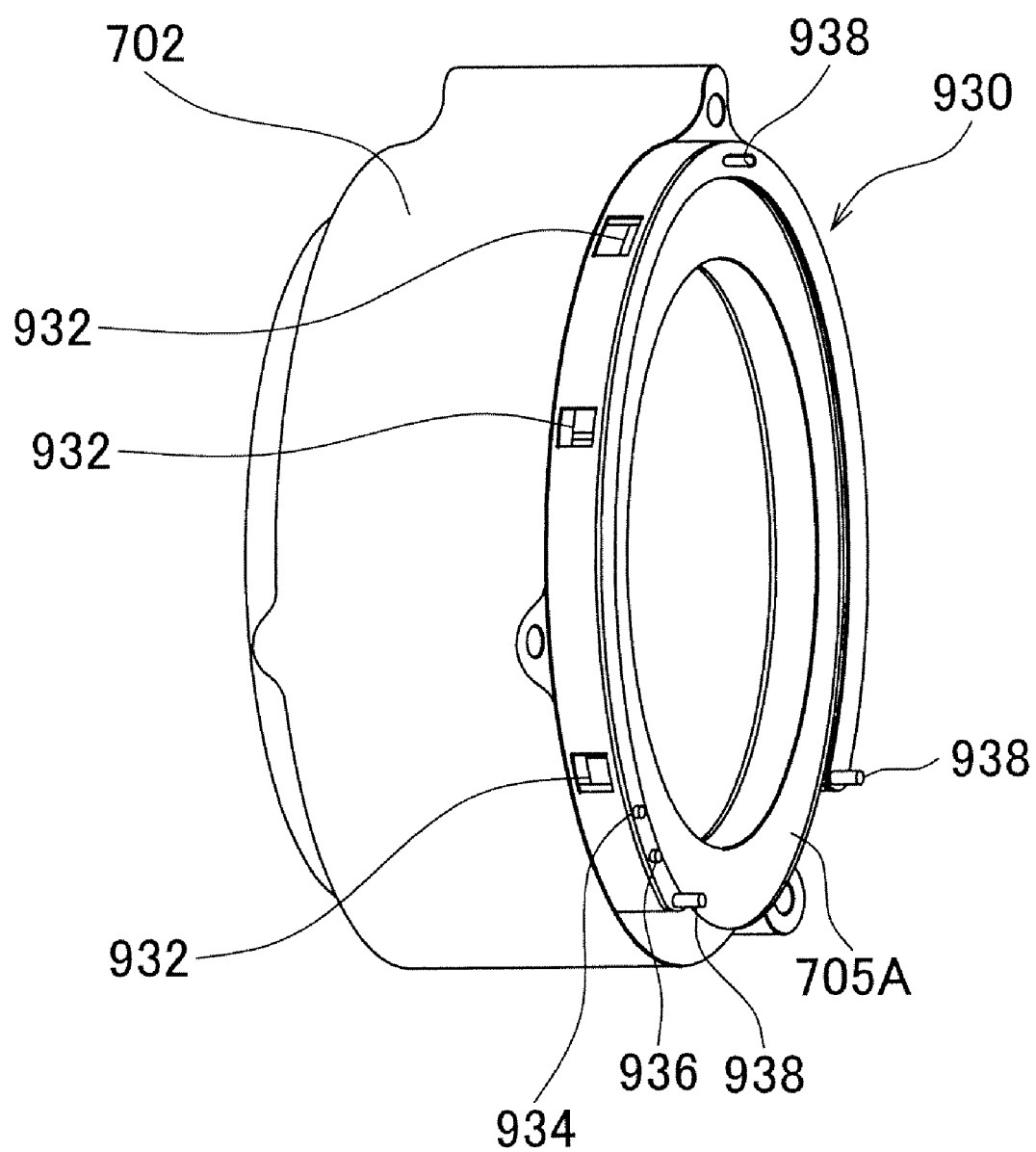
FIG. 3 is a perspective view of the oil delivery arranged around a coil end of the stator core.

FIG. 3 is a perspective view, as viewed from the vehicle outside, of the oil delivery 930 arranged around a coil end 705A of the stator core 702.

FIG. 4 shows the oil flow paths for cooling the motor 700 and lubricating the bearings 820, 830, and 800, and is a plan view, as viewed from the vehicle inside, of the inside of the peripheral wall portion 430 of the knuckle 400 with the motor cover 750 and the internal elements of the motor 700 and the like omitted. In the drawing, members of little relevance in describing the oil flow paths are omitted as appropriate.

Figure 5:
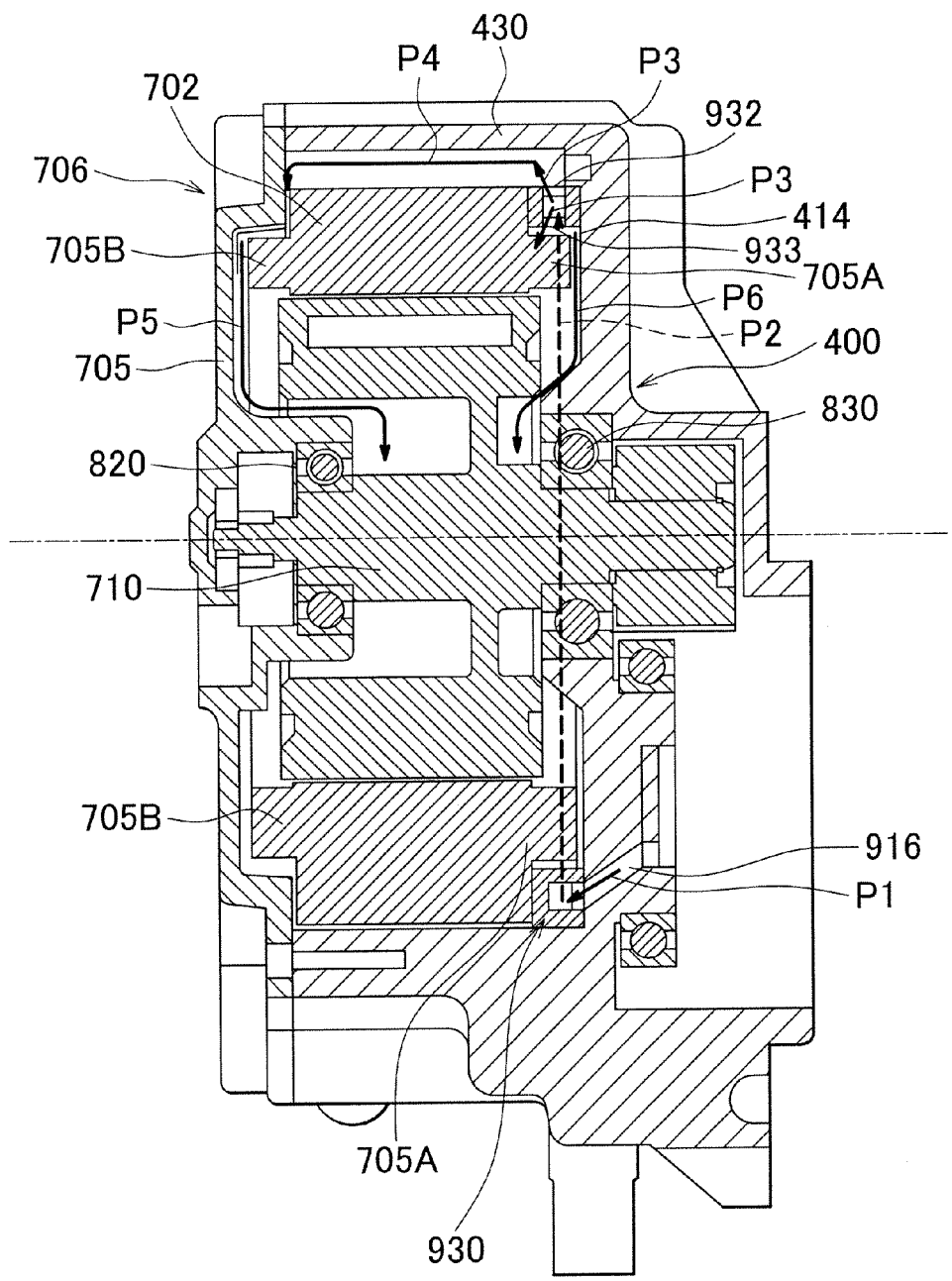
FIG. 5 is a view illustrating the flow of oil from the oil pump to the oil delivery and the flow of oil near the upper portion of the motor.

FIG. 5 is a sectional view cut along a different plane than is shown in the sectional view in FIG. 1, and shows the flow of oil from the oil pump 300 to the oil delivery 930 and the flow of oil near the upper portion of the motor 700. In FIG. 5, a pressure oil passage 916 leading from the oil pump 300 is shown so that it appears to extend parallel to the axle center for convenience of explanation. In actuality, however, the pressure oil passage 916 does not extend parallel to the axle center, but instead extends in a direction that connects the outlet 306 of the oil pump 300 with an inlet hole 936 of the oil delivery 930, as shown in FIG. 4. However, depending on the manner in which the motor 700 is offset and the like, it is also possible to have the pressure oil passage 916 extend parallel to the axle center.

Figure 6:
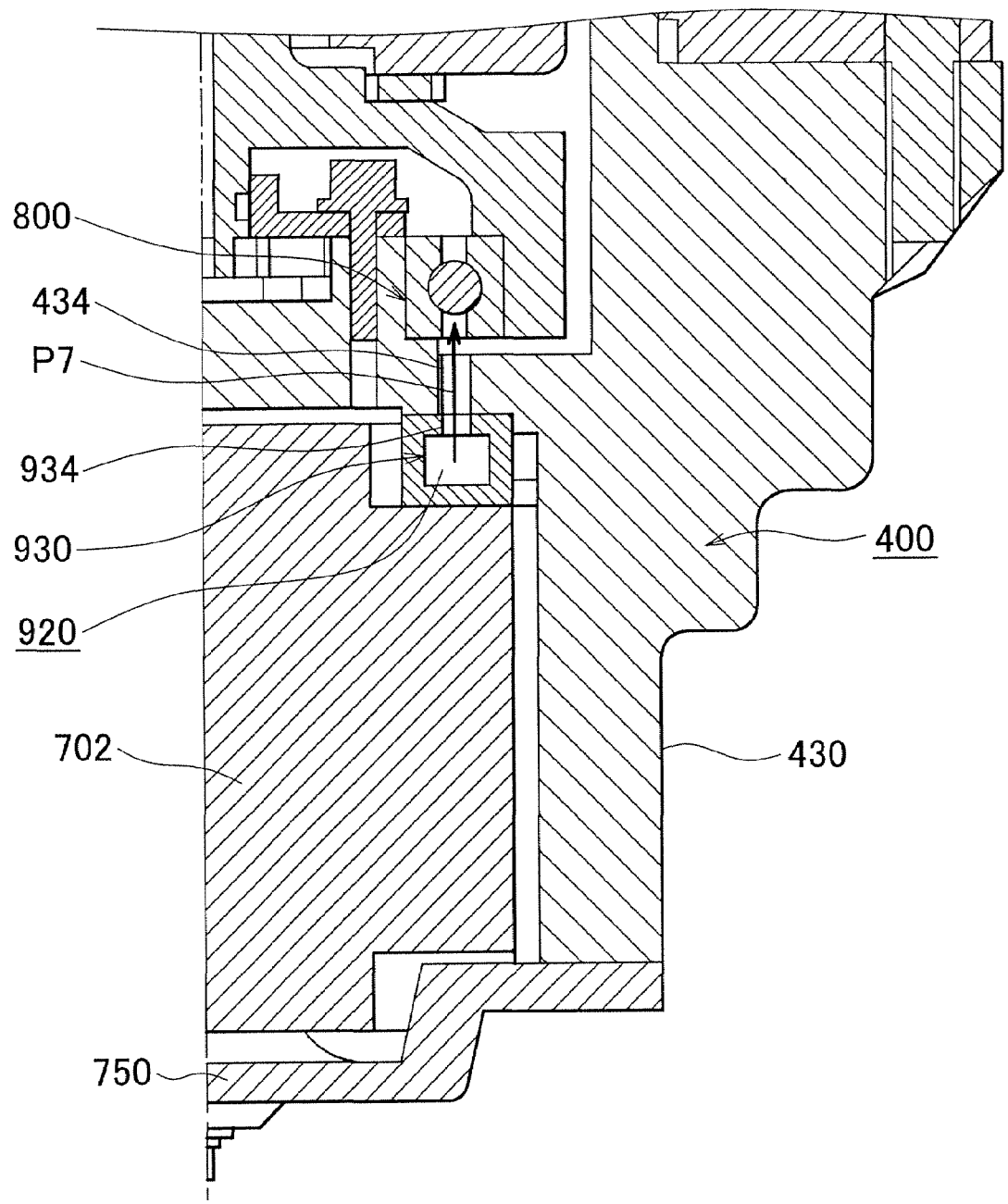
FIG. 6 is a sectional view illustrating the flow of oil to the bearing.

FIG. 6 is a sectional view illustrating the flow of oil to the bearing 800, and corresponds to the sectional view taken along line VI-VI in FIG. 4. The motor cover 750 and the internal elements of the motor 700 and the like which are not shown in FIG. 4 are shown here in FIG. 6.

The oil flow path 920 (see also FIG. 1) provided using the space near the coil end 705A is communicated with the outlet 306 of the oil pump 300. The oil flow path 920 encircles the coil end 705A at a corner portion near the base of the peripheral wall portion 430 of the knuckle 400, as shown in FIG. 4. The oil flow path 920 is formed by a member 930 (i.e., the oil delivery 930) that is separate from the knuckle 400.

The oil delivery 930 is arc-shaped with an inner radius that is slightly larger than the radius of the outer periphery of the coil end 705A, as shown in FIGS. 1 and 2. The oil delivery 930 is tubular such that the oil flows inside it, as shown in FIGS. 1 and 5. The oil delivery 930 is made of aluminum casting or resin molding, for example.

The oil delivery 930 is arranged in the gap or space on the outer peripheral side of the coil end 705A on the vehicle outside of the stator coil 704, as shown in FIGS. 1 and 5. That is, the oil delivery 930 is arranged so as to surround the outer peripheral side of the coil end 705A of the stator core 702. In this case, there is no longer a need to provide a separate space for arranging the oil delivery 930 so an efficient arrangement that does not increase the size of the motor 700 can be realized.

The oil delivery 930 is arranged so as to be tightly sandwiched in the vehicle width direction between a bottom surface 414 of the knuckle 400 and the vehicle outside end surface of the stator core 702, as shown in FIGS. 1 and 5. Meanwhile, in the radial and axial (i.e., vehicle width) directions, the oil delivery 930 is arranged so that a gap is formed between it and the outer peripheral side of the coil end 705A, as shown in FIGS. 1 and 5.

The oil delivery 930 has protrusions 938 formed in the axial direction toward the vehicle outside in angular positions at appropriate intervals in the circumferential direction, as shown in FIG. 3. Insertion holes 438 are formed in angular positions corresponding to the protrusions 938, as shown in FIG. 2, in the bottom portion 414 of the knuckle 400. Of the insertion holes 438, only the insertion hole 438 that corresponds to the vehicle front side protrusion 438 is shown in FIG. 2.

The oil delivery 930 has the inlet hole 936 formed in an angular position near the axle center, as shown in FIGS. 3, 4, and 5. This inlet hole 936 opens in the axial direction to the vehicle outside. The pressure oil passage 916, which provides communication between the inlet hole 936 of the oil delivery 930 and the outlet 306 of the oil pump 300, is formed in the knuckle 400, as shown in FIGS. 4 and 5.

Also, the oil delivery 930 has distribution holes 932 that open to the outside in the radial direction formed in angular positions at appropriate intervals in the circumferential direction, as shown in FIGS. 2, 3, and 4. Oil grooves 432 that extend in the axial direction are formed at each of the angular positions corresponding to the distribution holes 932 in the inner peripheral surface of the peripheral wall portion 430 of the knuckle 400, as shown in FIGS. 2 and 4.

Also, the oil delivery 930 has distribution holes 933 that open to the inside in the radial direction formed in angular positions at appropriate intervals in the circumferential direction, as shown in FIGS. 2 and 4. In the example shown in the drawing, the distribution holes 933 are formed in the same angular positions as the distribution holes 932. Alternatively, however, the set number and angular positions of the distribution holes 933 may be different than those of the distribution holes 932.

Also, the oil delivery 930 has a bearing delivery hole 934 formed near an angular position in the circumferential direction that intersects with the position in which the bearing 800 is arranged when viewed from the axial direction, as shown in FIG. 4. The bearing distribution hole 934 opens to the vehicle outside (i.e., in a direction perpendicular to the paper on which FIG. 4 is drawn). A distribution hole 434 that provides communication between the bearing distribution hole 934 and the bearing 800 is formed in the knuckle 400, as shown in FIG. 6. The distribution hole 434 extends in the axial direction from the bearing distribution hole 934 to the bearing 800. The distribution hole 434 does not necessarily have to extend parallel to the axle center, but rather may be formed inclined when viewed from the axial direction, just like the pressure oil passage 916 in the drawing.

During assembly, the oil delivery 930 is first mounted to the stator core 702, as shown in FIG. 3. Then the oil delivery 930 and the stator core 702 are assembled as a unit to the knuckle 400. That is, the stator core 702 with the oil delivery 930 assembled thereto is inserted into the peripheral wall portion 430 of the knuckle 400. At this time, the protrusions 938 on the oil delivery 930 (see FIG. 3) fit into the corresponding insertion holes 438 in the bottom portion 414 of the knuckle 400. As a result, the oil delivery 930 is able to be correctly positioned in the circumferential direction with respect to the knuckle 400. Next, the stator core 702 is fixed to the knuckle 400 by fastening bolts, not shown, which have been screwed into bolt holes 450 (see FIG. 2) into bolt holes 452 in the knuckle 400 (see FIG. 2, etc.). Accordingly, the oil delivery 930 is sandwiched tightly between the bottom portion 414 of the knuckle 400 and the vehicle outside end surface of the stator core 702. Thus, in this example embodiment, the oil delivery 930 is fixed to the knuckle 400 by being fastened to the stator core 702 so assembly is simple and a good assembled state is achieved. Also, the processes for adhering or fastening and the like (e.g., an adhesion applying process), as well as the number of parts, can be reduced compared to a structure in which the oil delivery is connected by adhesion or fastening or the like to the knuckle 400 separately from being fastened to the stator core 702.

Next, the flow of oil in the oil flow paths 910 and 920 when the oil pump 300 is operating will be described.

The oil that was discharged from the outlet 306 (see FIG. 4) of the oil pump 300 to the oil flow path 910 is supplied to the bearing 810 (see FIG. 1) via the opening 914 in the tip end portion of the shaft 250, and supplied to the planetary gears 224 (see FIG. 1) via the oil holes 912 by centrifugal force generated as the shaft 250 rotates. The oil supplied in this way is used to lubricate the bearing 810, as well as the roller bearings 225 at the rotational center of the planetary gears 224. The oil used for cooling or lubrication in this way is then finally returned to the oil tank 310 via the oil return path 313 by gravity.

Also, oil is supplied from the outlet 306 (see FIG. 4) of the oil pump 300 to the oil flow path 920 (i.e., the flow path inside the oil delivery 930), as shown by arrow P1 in FIGS. 4 and 5, via the pressure oil passage 916 and the inlet hole 936 of the oil delivery 930. The oil supplied to the oil flow path 920 is then delivered to the area around the coil end 705A, as shown by arrow P2 in FIGS. 4 and 5. In this process, some of the oil is supplied to the bearing 800 via the bearing distribution hole 934 of the oil delivery 930 and the distribution hole 434 of the knuckle 400, as shown by arrow P7 in FIG. 6, where it is used to lubricate the bearing 800. Meanwhile, some of the oil is also delivered radially inward and outward out of the oil delivery 930 via the plurality of distribution holes 932 and 933, as shown by arrow P3 in FIGS. 4 and 5.

The oil discharged into the oil grooves 432 via the distribution holes 932 is led in the direction in which the oil grooves 432 extend, as shown by arrow P4 in FIG. 5, so that it flows around the entire outer peripheral surface of the stator core 702, thus cooling the entire stator core 702. Similarly, the oil discharged via the distribution holes 933 directly contacts the coil end 705A of the stator core 702, as shown by arrows P3 in FIGS. 4 and 5 (i.e., the arrows pointing radially inward), thus cooling the entire stator coil 704 which is centered around the coil end 705A. Cooling is achieved by the heat of the oil being released into the ambient air via the knuckle 400 and the like. That is, the oil flows through the inside of the motor 700 in order to function as a heat exchange medium.

Oil supplied to the inside of the motor 700 via the distribution holes 932 and the oil grooves 432 contacts the coil end 705B on the vehicle inside via the gap between the motor cover and the stator core 702, as shown by the tip end of arrow P4 in FIG. 5, thus cooling the coil end 705B. Also, the oil supplied via the distribution holes 932 and the oil grooves 432 then reaches the output shaft 710 of the motor 700, as shown by arrow P5 in FIG. 5, and lubricates the bearing 820. Similarly, oil supplied to the inside of the motor 700 via the distribution holes 933 reaches the output shaft 710 of the motor 700 via the gap between the bottom portion 414 of the knuckle 400 and the stator coil 704, as shown by arrow P6 in FIG. 5, and lubricates the bearing 830.

In addition to the effects described in the description thus far, the structure of the foregoing example embodiment also displays the following effects in particular.

First, as described above, installing the oil delivery 930 obviates the need to machine the oil flow path 920 and multiple distribution holes 932 and the like in the bottom portion 414 and the peripheral wall portion 430 of the knuckle 400 using a drill, which is difficult work, so machining costs are reduced. Further, there is no longer a need for measures to block the openings at the end portions of the machined holes, which would otherwise be necessary if holes were machined. Incidentally, the oil grooves 432 in the peripheral wall portion 430 of the knuckle 400 are open in the radial direction toward the center axis of the motor 700, as is also evident from the structure shown in FIG. 2. This makes the grooves 432 easy to form during manufacturing of the knuckle 400 (e.g., they can easily be formed by molding) so there is no need to form them with post-processing by drilling or the like after the knuckle 400 is formed.

Also, as described above, installing the oil delivery 930 obviates the need to install a portion for an oil passage (i.e., a thick portion) on the bottom portion 414 and the peripheral wall portion 430 of the knuckle 400. In particular, with the arrangement of the oil delivery 930 using the open space near the coil end 705A, as described above, space can be efficiently conserved so the size of the peripheral wall portion 430 of the knuckle 400 in the radial direction can be efficiently reduced compared to with a structure in which an oil flow path is formed by machining holes in the motor case. Incidentally, in this example embodiment, the motor case is realized by the bottom portion 414 and the peripheral wall portion 430 of the knuckle 400.

Also, the oil delivery 930 is formed of resin or the like separately from and independent of the motor case (i.e., the bottom portion 414 and the peripheral wall portion 430 of the knuckle 400 in this example), as described above. Therefore, the degree of freedom with respect to the shape of the oil delivery 930 increases, and the degree of freedom with respect to setting the oil flow path 920 increases compared to when holes are opened using a drill. For example, the oil delivery 930 in the drawings extends from an angular position near the axle center to an angular position approximately 300 degrees counterclockwise along a circular path, as shown in FIG. 4. However, the oil delivery 930 may extend 360 degrees instead of 300 degrees. This modification can be easily realized by forming the oil delivery in a ring shape. Also, conversely, the oil delivery may also extend from an angular position near the axle center to an angular position approximately 180 degrees counterclockwise along a circular path, for example. This modification can be easily realized by simply shortening the length of the oil delivery in the circumferential direction.

With this example embodiment, the oil delivery 930 is made of resin or the like separately from the motor case, as described above, so there is a higher degree of freedom in design with respect to the diameter and position of the distribution holes 932 than there is when the distribution holes are formed using a drill. That is, each distribution hole 932 can be set in the optimum position at the optimum diameter, which increases the degree of freedom in determining the distribution of oil. For example, a large amount of oil can be supplied to the oil grooves 432 that are vertically higher when the oil delivery 930 is mounted (such as the third and fourth oil grooves 432 in the counterclockwise direction in FIG. 4), while only a small amount of oil is supplied to the oil groove 432 that is vertically lower when the oil delivery 930 is mounted (such as the seventh oil groove 432 in the counterclockwise direction in FIG. 4). This kind of oil distribution is beneficial for efficiently spreading the oil over the entire motor 700. This oil distribution can be realized by increasing the diameters of the distribution holes 932 corresponding to the higher oil grooves 432 and decreasing the diameter of the distribution hole 932 corresponding to the lower oil groove 432.

Also, as described above, the oil delivery 930 is arranged adjacent to the coil end 705A so that oil can be directly supplied to the coil end 705A. As a result, the coil end 705A which generates a large amount of heat can be cooled efficiently.

Also, with the motor 700 being arranged offset and the oil pump 300 being operated by the shaft 250 (which is concentric to the axle center) which rotates at a slower rate, as described above, the flow path from the oil pump 300 to the oil delivery 930 can be effectively made shorter. That is, by arranging the oil delivery 930 around the coil end 705A from an angular position near the axle center, as described above, the length of the pressure oil passage 916 can be made shorter.

Further, the oil delivery 930 is arranged so as to be tightly sandwiched in the vehicle width direction between the bottom portion 414 of the knuckle 400 and the vehicle outside end surface of the stator core 702. This both facilitates assembly of the oil delivery 930 and appropriately prevents oil from leaking radially inward and outward from the oil delivery 930. To further increase this effect, an elastic or bendable layer or member (such as an O-ring) such as rubber or flexible resin may be adhered or fitted, for example, to one or both sides in the vehicle width direction of the oil delivery 930. As a result, the tightness in the vehicle width direction between the bottom portion 414 of the knuckle 400 and the stator core 702 is increased, thus preventing, to the greatest extend possible, oil from leaking radially inward and outward from the oil delivery 930. That is, oil from the gap between the inner peripheral side of the oil delivery 930 and the outer peripheral side of the coil end 705A is prevented from mixing with oil from the gap (particularly the oil grooves 432) between the outer peripheral side of the oil delivery 930 and the peripheral wall portion 430 of the knuckle 400. Therefore, the actual distribution amount (i.e., the distribution ratio) of oil can be appropriately prevented from deviating from the desired oil distribution amount due to leaking oil. From the same viewpoint, the oil delivery 930 itself may also be made of elastic material such as rubber or flexible resin.

Also, machining holes that extend from the outlet 306 of the oil pump 300 to the bearing 800 in the knuckle 400 in order to form the oil supply path to the bearing 800 which is arranged on the outer peripheral side of the oil pump 300 is extremely difficult. In contrast, in this example embodiment, oil from the oil pump 300 is supplied to the bearing 800 via the oil delivery 930, as described above, so only the straight distribution hole 434 and pressure oil path 916, which are easy to machine, need to be formed which greatly reduces machining costs. That is, the pressure oil path 916 is needed to supply oil to the motor 700, as described above, so oil can be supplied to the bearing 800 by essentially only adding the distribution hole 434. Also, the oil delivery 930 is arranged so that it passes close to the bearing 800 when viewed in the axial direction so the distribution hole 434 can be made the shortest linear distance for the same reason as the pressure oil path 916.

While example embodiments of the invention have been illustrated above, it is to be understood that the invention is not limited to details of the illustrated embodiments, but may be embodied with various changes, modifications or improvements without departing from the spirit and scope of the invention.

For example, in the illustrated example, the oil delivery 930 is first assembled to the stator core 702 and then the oil delivery 930 and the stator core 702 are assembled as a unit to the knuckle 400. Alternatively, however, the oil delivery 930 may first be assembled to the knuckle 400 and then stator core 702 may be assembled to the knuckle 400. In this case as well, the oil delivery 930 is supported positioned with respect to the knuckle by fitting the protrusions 938 on the oil delivery 930 into the insertion holes 438 in the bottom portion 414 of the knuckle 400, which facilitates assembly and results in a good assembled state.

Also, in the example in the drawings, the motor case is formed by the bottom portion 414 and the peripheral wall portion 430 of the knuckle 400. Alternatively, however, the motor case may also be formed by a member that is separate from the knuckle 400, or may be cooperatively formed by the knuckle 400 and a separate member.

Further, in the example in the drawings, the oil grooves 432 in the peripheral wall portion of the knuckle 400 have a structure that does not require holes to be drilled in the peripheral wall portion 430 of the knuckle 400. However, they may be formed by drilling similar oil grooves or holes. Also, the oil grooves 432 may be formed by a member that is separate from the peripheral wall portion 430 of the knuckle 400, similar to the oil delivery 930.

Moreover, in the illustrated example, a plurality of distribution holes 932 are formed in the oil delivery 930. However, the distribution holes 932 do not have to be a plurality, i.e., there may instead be only a single distribution hole 932. While this would not be as advantageous as the example embodiment described above, oil can be supplied inside the motor 700 and dispersed to some extent by forming only a single distribution hole 932 that has a relatively wide opening at the highest position in the oil delivery 930.

Further, the example in the drawings relates to a structure of the motor 700 when applied to a wheel assembly with an in-wheel motor. However, as long as the motor is one which requires oil (or other fluid) for cooling, the invention can be similarly applied to another type of motor or a motor that is arranged in another location.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A motor comprising:
   a stator core;
   a coil;
   a rotor;
   a motor case in which the stator core, the coil, and the rotor are housed; and a substantially annular fluid carrying member which is provided on a coil end of the coil in the motor case and has an inlet hole that is communicated with a fluid supply source and a distribution hole that is communicated with a space inside the motor case, wherein
   the fluid supply source is driven by rotational output of a rotating shaft of a counter gear which reduces a rate of rotational output of an output shaft of the motor and transmits a resultant rotational output to a wheel.

2. An in-wheel motor structure, comprising:
   a motor that drives a wheel, which is arranged within the wheel and has a stator core, a coil, a rotor, and a motor case in which the stator core, the coil, and the rotor are housed;
   an oil pump that is driven by rotational output of a rotating shaft of a counter gear which reduces a rate of rotational output of an output shaft of the motor and transmits a resultant rotational output to the wheel; and
   a substantially annular fluid carrying member which is provided on a coil end of the coil in the motor case and has an inlet hole that is communicated with the oil pump, and a distribution hole that is communicated with a space inside the motor case.

3. An in-wheel motor structure, comprising:
   a motor that drives a wheel, which is arranged within the wheel and has a stator core, a coil, a rotor, and a motor case in which the stator core, the coil, and the rotor are housed;
   a counter gear which reduces a rate of rotational output of an output shaft of the motor and transmits a resultant rotational output to the wheel;
   a bearing that rotatably supports a rotating shaft of the counter gear;
   a fluid supply source that is driven by rotational output of the rotating shaft of the counter gear; and
   a substantially annular fluid carrying member which is provided on a coil end of the coil in the motor case and has an inlet hole that is communicated with the fluid supply source and a distribution hole that is communicated with the bearing.

4. An in-wheel motor structure, comprising:
   a motor that drives a wheel, which is arranged within the wheel and has a stator core, a coil, a rotor, and a motor case in which the stator core, the coil, and the rotor are housed;
   a counter gear which reduces a rate of rotational output of an output shaft of the motor and transmits a resultant rotational output to the wheel;
   a bearing that rotatably supports a rotating shaft of the counter gear;
   a fluid supply source that is driven by rotational output of the rotating shaft of the counter gear;
   a substantially annular fluid carrying member which is provided on a coil end of the coil in the motor case and has an inlet hole that is communicated with the fluid supply source; and
   a distribution hole which is formed in the motor case and supplies fluid from the fluid supply source to the bearing.

* * * * *